United States Patent [19]

Tanaka

[11] Patent Number: 4,655,032
[45] Date of Patent: Apr. 7, 1987

[54] GRASS TRIMMER
[75] Inventor: Hiroyuki Tanaka, Tanashi, Japan
[73] Assignee: Kioritz Corporation, Tokyo, Japan
[21] Appl. No.: 714,522
[22] Filed: Mar. 21, 1985
[30] Foreign Application Priority Data Mar. 29, 1984 [JP] Japan ............................. 59-45357[U]

[51] Int. Cl.[4] ........................................... A01D 34/82
[52] U.S. Cl. ..................................... 56/12.7; 30/276; 464/173
[58] Field of Search ........................... 24/235; 56/12.7; 464/52, 173; 30/276

[56] References Cited

U.S. PATENT DOCUMENTS

| | | | |
|---|---|---|---|
| 2,884,771 | 5/1959 | Holt | 464/173 |
| 3,234,757 | 2/1966 | Stadelmann | 464/52 |
| 3,587,248 | 6/1971 | Umanos | 464/52 |
| 3,828,580 | 8/1974 | Armbruster | 464/52 |
| 4,126,928 | 11/1972 | Hoff | 464/173 |
| 4,148,141 | 4/1979 | Hoff | 56/12.7 |
| 4,203,212 | 5/1980 | Proulx | 56/12.7 |
| 4,280,333 | 7/1981 | Shannon et al. | 464/52 |
| 4,281,504 | 8/1981 | Moore | 56/12.7 |
| 4,335,585 | 6/1982 | Hoff | 464/173 |
| 4,451,983 | 6/1984 | Johnson et al. | 464/52 |
| 4,478,592 | 10/1984 | Krude et al. | 464/173 |

Primary Examiner—Paul J. Hirsch
Attorney, Agent, or Firm—Browdy and Neimark

[57] ABSTRACT

A grass trimmer has a support which supports a portion of a control rod on the side thereof which is closer to a prime mover in such a manner that the portion is received inside the support and which rotatably supports the output shaft of a clutch for coupling a transmission shaft received inside the control rod. The support has its outer periphery covered with a tubular elastic cover.

1 Claim, 4 Drawing Figures

GRASS TRIMMER

BACKGROUND OF THE INVENTION

The present invention relates to a grass trimmer which employs a prime mover such as an internal combustion engine as its power source and includes a support which fixedly supports a portion of a control rod on the side thereof which is closer to the prime mover and rotatably supports the output shaft of a clutch for coupling a transmission shaft received inside the control rod.

It is generally common for a grass trimmer to be handled by an operator during operation in such a manner that he holds not only the grip which is provided on the control rod but also the support portion where the output shaft of the clutch is supported. In particular, a so-called single-rod type grass trimmer which has a grip directly attached to the control rod is frequently handled in the manner described above. On the other hand, when the grass trimmer is continuously used over a long period of time, the support is undesirably heated to considerably high temperatures by the heat transmitted from, for example, the clutch portion. Further, if the support portion is not well insulated against vibration, it is disadvantageously difficult for the operator to handle the grass trimmer properly while at the same time holding the support.

SUMMARY OF THE INVENTION

It is a primary object of the present invention to provide a grass trimmer in which the support has its outer periphery covered with a tubular elastic cover, thereby overcoming the above-described problems of the prior art.

To this end, according to the invention, there is provided, in a grass trimmer of the type having a support which supports a portion of a control rod on the side thereof which is closer to a prime mover in such a manner that the portion is received inside the support and which rotatably supports the output shaft of a clutch for coupling a transmission shaft received inside the control rod, an improvement characterized by comprising a tubular elastic cover which covers the outer periphery of the support.

Thus, according to the arrangement of the present invention, the outer periphery of the support is covered with a tubular elastic cover and, therefore, it is possible to provide a grass trimmer which has improved operability and permits safe and comfortable handling even when continuously used over a long period of time.

The above and other objects, features and advantages of the present invention will become clear from the following description of the preferred embodiment thereof, taken in conjunction with the accompanying drawings.

DESCRIPTION OF THE PREFERRED EMBODIMENT

The present invention will be described hereinunder through one embodiment with reference to the accompanying drawings.

Figure 1:
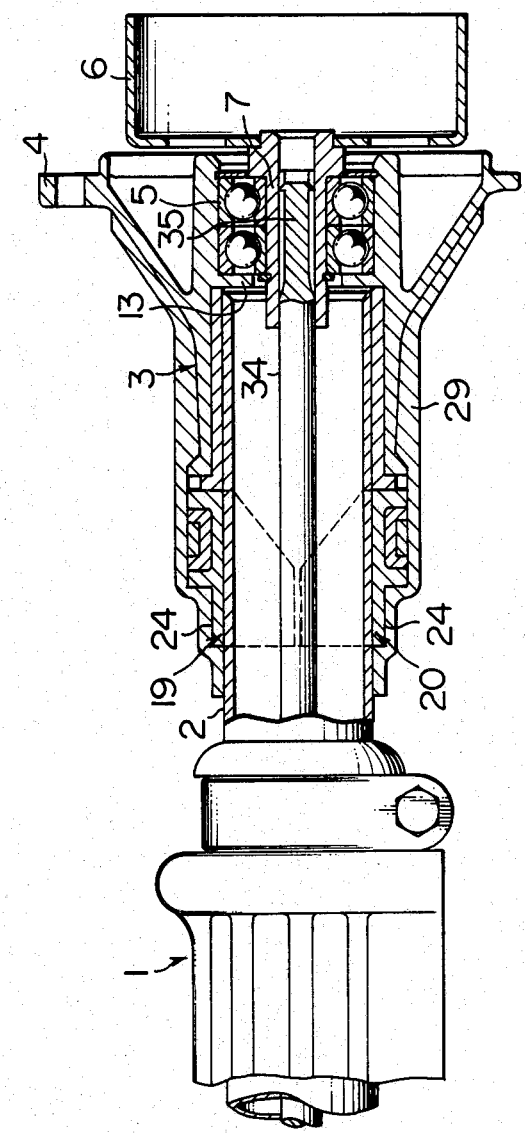
FIG. 1 is a partly-sectioned side elevational view of an essential portion of the grass trimmer according to the present invention.

Referring first to FIG. 1, there is shown a tubular support 3 which supports a portion 2 of a control rod 1 of the grass trimmer according to the present invention, the portion 2 being on the side of the control rod 1 which is closer to a prime mover (not shown) and being received inside the tubular support 3. The tubular support 3 is bolted to the prime mover through a flange portion 4 at one of its ends. Moreover, the tubular support 3 rotatably supports at this end an output shaft 7 of a transmission clutch 6 through bearings 5 which are mounted inside the tubular support 3. At the other end, the support 3 fixedly supports the prime mover-side portion 2 of the control rod 1 by means of fixing members 19, 20.

Figure 2:
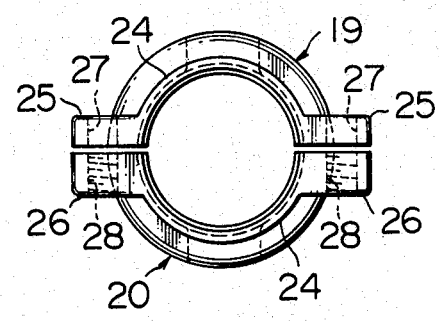
FIG. 2 is an end view of fixing members employed in the grass trimmer shown in FIG. 1.

The fixing member 19 has a pair of projecting portions 25 (see FIG. 2) which are integrally formed at both circumferential ends of its outer peripheral surface 24 outward of its flange portion. The fixing member 20 also has a pair of projecting portions 26 which are similarly formed on its outer peripheral surface 24. Each of the projecting portions 25 of the fixing member 19 is formed with a bore 27, while each of the projecting portions 26 of the fixing member 20 is formed with a threaded hole 28 which is aligned with the corresponding bore 27, whereby it is possible to secure the control rod 1.

Figure 3:
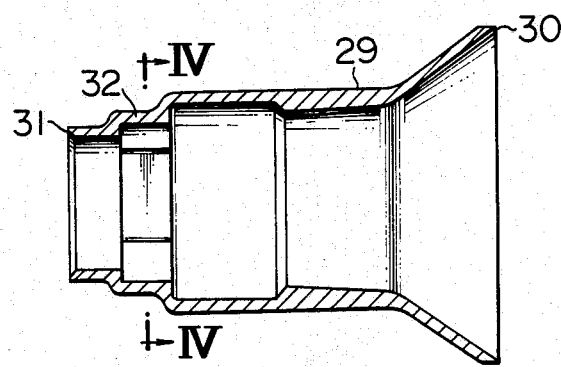
FIG. 3 is a vertical sectional view of a cover employed in the grass trimmer shown in FIG. 1.
Figure 4:
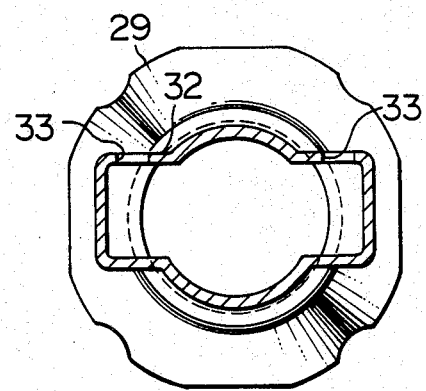
FIG. 4 is a sectional view taken along the line IV—IV of FIG. 3.

The tubular support 3 thus connected with the control rod 1 is then covered with a tubular elastic cover 29. The cover 29 is made of rubber and is formed such that it has a tubular shape as a whole which is substantially coincident with the outer shape of the tubular support 3, as shown in FIGS. 3 and 4. The cover 29 has open ends 30 and 31. The respective projecting portions 25 and 26 of the fixing members 19 and 20 are disposed inside a portion 32 of the cover 29. The portion 32 is formed with a pair of bores 33 which are aligned with the corresponding bores 27 respectively formed in the projecting portions 25.

The prime mover-side portion 2 of the control rod 1 is inserted into the space defined by the fixing members 19 and 20 from the end 31 of the cover 29 until the distal end of the portion 2 is in close proximity to an inner wall 13 of the support 3. In addition, a spline shaft portion 35 formed at the distal end of a rotary transmission shaft 34 received inside the control rod 1 is engaged to the output shaft 7 of the clutch 6. Then, a pair of bolts (not shown) are respectively inserted into the bores 33 in the cover 29, passed through the bores 27 in the projecting portions 25 of the fixing member 19, screwed into the threaded holes 28 in the projecting portions 26 of the fixing member 20 and tightened firmly, whereby the control rod 1 is inseparably retained by the fixing members 19 and 20.

What is claimed is:

1. In a grass trimmer of the type including
   a prime mover,
   a control rod including a tubular portion extending from the prime mover,
   a tubular support having a first end supporting the tubular portion of the control rod, and a second end, clutch means adjacent the second end of the tubular support, transmission means including a transmission shaft connecting the clutch means with the prime mover, the transmission shaft having one end coupled to the prime mover and an opposite end coupled to the clutch means, and being disposed within the tubular support, clamping members, coupled to the tubular support adjacent the first end thereof, for securing the tubular portion of the control rod to the tubular support, the improvement comprising:

a tubular elastic cover covering the outer periphery of said tubular portion of said control rod and at least a major portion of said tubular support including the portion adjacent said tubular portion, the outer surface of said cover being configured as a grip for an operator's hand and insulating the operator's hand from vibration and heat transmitted by said prime mover or by said clutch means.

* * * * *